358-86. XR 2,911,469 SR
Nov. 3, 1959 N. A. BLAKE 2,911,469
BLANKING SYSTEM
Filed Nov. 25, 1955
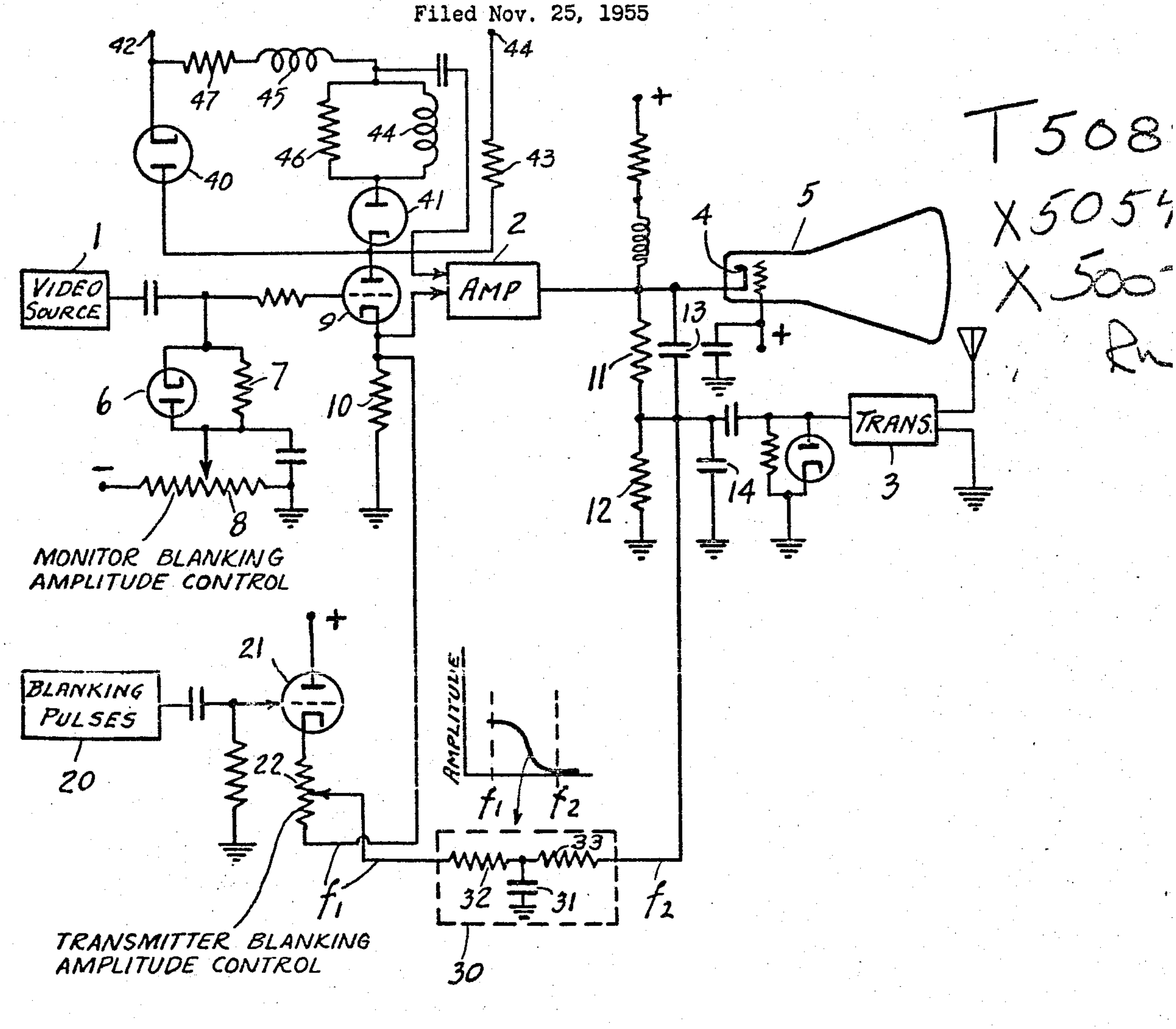
INVENTOR.
NEAL A. BLAKE.
BY Lockwood, Galt, Woodard & Smith
ATTORNEYS.

United States Patent Office 2,911,469

Patented Nov. 3, 1959

2,911,469

BLANKING SYSTEM

Neal Axtell Blake, Fort Wayne, Ind., assignor to International Telephone and Telegraph Corporation Application November 25, 1955, Serial No. 549,049

6 Claims. (Cl. 178—7.2)

This invention relates to blanking circuits for closed circuit television transmitter systems and the like.

At a television transmitter station, the video signal obtained from the camera tube must be amplified before it is applied to the modulating equipment of the high frequency carrier transmitter. This high frequency carrier must also be modulated by blanking pulses for marking the horizontal and/or vertical scanning sweeps. The video and blanking pulses must also be applied to the kinescope of the monitoring section of the transmitter station. Since the blanking pulses must be applied to the input circuits of the video amplifier as well as to the input of the transmitter, there is established a feedback circuit between the output and input of the video amplifier which can cause undesired oscillations or ringing. Heretofore, separate cathode-follower amplifiers have been inserted between the blanking pulse source and the input to the transmitter and the input to the video amplifier.

The object of this invention is to reduce the number of cathode followers and their associated circuit components, and at the same time prevent feedback between the output and input of the amplifier.

The above-mentioned and other features and objects of this invention and the manner of attaining them will become more apparent and the invention itself will be best understood by reference to the following description of an embodiment of the invention taken in conjunction with the accompanying drawing in which the single figure is a circuit diagram of the improved transmitter system of this invention.

The video source 1 is amplified by the two stage amplifier 2 and is applied to the input of the transmitter 3. The output of the amplifier is also applied to one of the input electrodes, such as the cathode 4, of the monitoring kinescope 5. Where the video signal is applied to the cathode as shown, the grid of the kinescope is grounded for video frequencies and is carried at a suitable biasing potential with respect to the cathode. In the particular video circuits shown, the black level of the video signals is clamped with respect to ground as by diode 6 and its parallel resistor 7 connected to ground through the black level or monitor blanking amplitude control 8. The first stage of this video amplifier is a clip-clamp circuit. The anode circuit of the amplifier 9 includes the side-by-side diodes 40 and 41 oppositely polarized as shown between the anode of amplifier 9 and the reference clip-voltage source 42. The anode of tube 9 is connected through resistor 43 to source 44. This resistor 43 sets the direct current operating potential of the anode with respect to the clipping voltage. Source 44 is at a voltage higher than source 42, say 300 volts and 150 volts, respectively. The video load for the stage is composed of the two coils 44, 45 and resistors 46, 47.

The video signal for the transmitter is obtained from the output of the video amplifier through the voltage dividers 11 and 12. Capacitor 13 is employed in this type of coupling circuit to compensate for the amplitude attenuation of the high frequency components of the video signal caused by the inherent input capacity 14 of the transmitter.

Blanking pulses for the transmitter and for the monitor kinescope are obtained from the blanking source 20 through the cathode-follower amplifier 21 with its cathode resistor 22. Monitor blanking is obtained by connecting the bottom end of the cathode resistor 22 to the cathode of the clip-clamp video stage 9. Video feedback from the output amplifier to the clipper stage is prevented by the filter 30 which is of the low-pass type designed to attenuate all high frequency video components. The blanking waveform to the transmitter is not appreciably deteriorated by such a filter since the low frequency video cutoff of the filter is usually ten times higher than the lowest blanking frequency necessary for horizontal blanking.

The particular filter 30 illustrated may comprise one or more capacitors 31 and one or more series resistors 32 and 33, and provides a low impedance path to ground for the high frequency video components inserted at the output terminals of the filter. However, resistor 33 provides isolation from ground for the output video circuit and thus prevents loading of the output circuit by the filter. Low frequency blanking components pass through the filter to the transmitter attenuated by the ratio $$\frac{R12}{R12+R32+R33}$$

Monitor blanking amplitude is controlled in the clipper stage by adjusting the monitor blanking amplitude control 8, while transmitter synchronizing pulses are controlled in amplitude by adjusting the potentiometer 22.

The single triode 21 and the simple RC filter 30 replace the two triode-cathode followers and their associated circuit components of the prior art. The circuit of this invention additionally provides separate non-interacting amplitude controls for the monitor and transmitter blanking pulses. Feedback of video frequencies from the output to the input of the video amplifier is effectively eliminated by the circuit of this invention.

While I have described above the principles of my invention in connection with specific apparatus, it is to be clearly understood that this description is made only by way of example and not as a limitation to the scope of my invention.

What is claimed is:

1. In a video system, a transmitter, a video amplifier having an output circuit, and a monitoring means; a voltage divider connected across the output circuit of said amplifier, the input circuits of said monitoring means and said transmitter being connected to spaced points on said divider; a source of blanking pulses having an output circuit coupled in parallel to the input circuit of said amplifier and to the transmitter-connected point on said divider; and means connected in circuit between the output circuit of said pulse source and said voltage divider for providing a low-impedance path to ground for video signals.

2. The system of claim 1 further comprising a series resistance connected in the pulse source-to-divider circuit for isolating said point from ground.

3. The system of claim 1 further comprising a monitor blanking amplitude control connected to the input circuit of said video amplifier, and a separate transmitter blanking amplitude control connected between the output circuit of said pulse source and said voltage divider.

4. In combination, a video transmitter and a monitor kinescope, a source of video signals, an amplifier for the signals having its input circuit coupled to the source, the output circuit of the amplifier being coupled in parallel to the input circuits of the transmitter and kinescope, a source of blanking pulses having its output circuit coupled directly to the input circuit of said amplifier and to the input circuit of the transmitter; and means connected in circuit with the output circuit of said pulse source for preventing signal feedback through the blanking circuit from the output to the input of said amplifier.

5. In the system defined in claim 4, said means comprising a filter connected in circuit between the output circuit of the blanking pulse source and the input circuit of the transmitter, said filter having high impedance for video signals and relatively low impedance for blanking pulses.

6. A television system comprising a transmitter, a video signal amplifier having its output circuit coupled to supply video signals to the input circuit of said transmitter, a monitoring picture tube having its input circuit coupled to the output circuit of the amplifier, a source of blanking pulses having its output circuit coupled to the input circuit of the amplifier and to the input circuit of the transmitter, a low pass filter serially connected between the output circuit of said source and the input circuit of said transmitter, said filter being constructed and arranged to attenuate all frequencies above a frequency intermediate the pulse frequency and the video frequencies.

References Cited in the file of this patent

UNITED STATES PATENTS

| | | |
|---|---|---|
| 2,110,982 | Campbell | Mar. 15, 1938 |
| 2,245,428 | Campbell | June 10, 1941 |
| 2,403,549 | Poch | July 9, 1946 |

OTHER REFERENCES

R.C.A. Radiotron Designer's Handbook by Langford-Smith, fourth edition 1954, page 371.

Journal of Society of Motion Picture Engineers, vol. 35, October 1940, pages 327–348.

Proceedings of the Institute of Radio Engineers, vol. 21, No. 12, December 1933, pages 1674–1691.